(12) United States Patent
Furuhashi et al.

(10) Patent No.: US 7,261,359 B2
(45) Date of Patent: Aug. 28, 2007

(54) APPARATUS FOR DRIVING WINDSCREEN OF VEHICLES

(75) Inventors: Kenichi Furuhashi, Akashi (JP);
Tamiya Takeuchi, Kakogawa (JP);
Tomoyuki Takahashi, Akashi (JP);
Akitsugu Kimura, Takarazuka (JP)

(73) Assignees: Kawasaki Jukogyo Kabushiki Kaisha, Hyogo (JP); Nippon Cable System, Inc., Hyogo (JP)

( * ) Notice: Subject to any disclaimer, the term of this patent is extended or adjusted under 35 U.S.C. 154(b) by 191 days.

(21) Appl. No.: 11/199,214

(22) Filed: Aug. 9, 2005

(65) Prior Publication Data

US 2006/0028045 A1 Feb. 9, 2006

(30) Foreign Application Priority Data

Aug. 9, 2004 (JP) ............................. 2004-232799

(51) Int. Cl.
*B60J 1/00* (2006.01)
(52) U.S. Cl. ..................................... 296/84.1; 296/96.2
(58) Field of Classification Search ............... 296/78.1, 296/84.1, 96.2
See application file for complete search history.

(56) References Cited

U.S. PATENT DOCUMENTS

| 1,941,176 | A | * | 12/1933 | Kraft | .......................... | 296/96.2 |
| 1,992,887 | A | * | 2/1935 | Potter | .......................... | 296/96.2 |
| 2,319,869 | A | * | 5/1943 | Kramer | ...................... | 296/96.2 |
| 4,479,663 | A | * | 10/1984 | Morris et al. | ............... | 296/78.1 |
| 4,830,423 | A | * | 5/1989 | Nebu et al. | ................ | 296/78.1 |
| 5,730,483 | A | * | 3/1998 | Greger | ...................... | 296/78.1 |

FOREIGN PATENT DOCUMENTS

| JP | 2000-159172 A | 6/2000 |
| JP | 2000-177668 A | 6/2000 |

* cited by examiner

*Primary Examiner*—Lori L. Lyjak
(74) *Attorney, Agent, or Firm*—Rader, Fishman & Gruaer PLLC

(57) ABSTRACT

A lightweight apparatus for driving windscreen of vehicles with having high rigidity is provided. An apparatus provided with front and rear guide rails 22, 23 that are mounted right and left in one pair on a vehicle body such as motorcycles etc., guide members 43, 44 moving in the front and rear guide rails, one pair of the right and left carrier plates 24 supported by guide members 43, 44 and fixed to the windscreen W, and the driving mechanism synchronously reciprocates the carrier plates 24. The driving mechanism comprises the control cables 14, 15, 16 which are wired like figure of 8, and the cable driving mechanism 17 that reciprocates the inner cable of the control cables.

7 Claims, 12 Drawing Sheets

(a)

(b)

(a)

(b)

APPARATUS FOR DRIVING WINDSCREEN OF VEHICLES

FIELD OF THE INVENTION

This invention relates to an apparatus for driving windscreen of vehicles. The vehicles include motorcycles, passenger cars, small crafts, snowmobiles etc.

BACKGROUND ARTS

[Patent Document 1] Japanese Unexamined Patent Publication No. 2000-159172
[Patent Document 2] Japanese Unexamined Patent Publication No. 2000-177668

In the Patent Document 1 and Patent Document 2, a windscreen regulator for motorcycle that electrically switches the windscreen (wind shield) between the conditions of being tilted and being upraised in some degree is disclosed. In the Patent Document 1, as shown in FIG. 12, a sort of three point support type windscreen regulator 100 is disclosed, in which the right and left edges of the windscreen 101 are coupled to a vehicle body (not shown in the figure) through the link 102 and the center of the lower edge of the windscreen is rotatably coupled to the carrier plate 104 guided by the guide rail 103. The carrier plate 104 is supported by one above and under pair of the guide roller 104a which rolls in the guide rail 103 having C-shaped cross section, and reciprocated by the cable driving mechanism 106 through the control cable 105. The cable driving mechanism 106 is provided with the drum 107 rotated by the motor M.

In the Patent Document 2, as shown in FIG. 13, a windscreen regulator 109, which drives the right and left edges of the windscreen 101 up and down is disclosed, comprising one right and left pair of the guide rail 103, 103 and one right and left pair of a guide mechanism composed of the carrier plates 108, 108 slidably provided on the each guide rail.

Further, in the Patent Document 2, as shown in FIG. 14, a windscreen regulator 113 is disclosed. This regulator 113 comprises a curved guide rail 110 forming convexity downward, one pair of the front and rear carrier plate 111,112 slidably guided by the guide rail 110, and the windscreen 101 supported by the carrier plates. In this structure, since the guide rail 110 is curved, the angle of the windscreen 101 changes with the position of the carrier plate 111,112.

Furthermore, in the Patent Document 2, as shown in FIG. 15, a windscreen regulator 114 is disclosed. This regulator 114 comprises the upper and lower guide rails 110a, 110b (or four above and under, right and left guide rails) angled each other, the carrier plates 111, 112 supported slidably by the above and under guide rails, wherein these carrier plates support the windscreen 101.

DISCLOSURE OF INVENTION

The windscreen regulator described above is subject to be bent when wind resistance is applied to the windscreen due to the low rigidity of the guide rails and the mounting parts. Strengthening the rigidity causes larger weight of the parts. This invention is directed to provide a lightweight windscreen driving device enabled to have high rigidity.

The present invention is an apparatus for driving a windscreen of vehicles that moves the windscreen for vehicles up and down. This apparatus comprises a pair of guide rails fixed to the right and left side of the vehicle, front and rear guide means movably located along the each guide rail, right and left carrier plates supported by the front and rear guide means supporting right side and left side of the windscreen, and an actuator which reciprocates the right and left carrier plates along the guide rails.

In such an apparatus, it is preferable that the right and left guide rails are divided into a front guide rail and a rear guide rail forming a salient angle or a reentrant angle upward or downward, that the front guide means is so located as to reciprocates along the front guide rail, and that the rear guide means is so located as to reciprocates along the rear guide rail. Further, it is preferable that the right and left guide rails are curved or bent forming salient angle upward or downward forming a front portion and a rear portion, that the front guide means is so located as to reciprocate along the front portion of the guide rail, and that the rear guide means is so located as to reciprocate along the rear portion of the guide rail. In any of the above apparatus, the cross section of the guide rail is preferable to be about C-shaped.

Further, the actuator is preferable to comprise a cable coupled to the carrier plate and a motor to reciprocate the cable. In addition, it is preferable that the actuator couples the right and left carrier plates with the cable having loop so as to synchronously reciprocate the right and left carrier plates along the guide rails by changing the rotative direction of the loop cable that is driven by the motor.

Furthermore, the cable of the actuator is preferable to comprise a first cable, where one end is fixed to either one of the right or the left carrier plate, the cable is extended backward along the relevant guide rail, turned around sideways by a diverting member in the vicinity of the rear end of the guide rail, guided to the vicinity of the front end of the other guide rail through a conduit tube, turned around backward by a diverting member, and extended backward along the relevant guide rail, and the other end is fixed to the other carrier plate which is guided by the relevant guide rail. The cable of the actuator also comprises a second cable, where one end is fixed to the other carrier plate, the cable is extended along the relevant guide rail, turned around sideways by a diverting member in the vicinity of the rear end of the guide rail, and guided through a conduit tube to a cable driving mechanism driven by the motor, and the other end is fixed to and wounded around a drum of the cable driving mechanism. The cable of the actuator further comprises a third cable where one end is fixed to and wounded around the drum, the cable is guided through a conduit tube to the vicinity of the front end of the guide rail which guides one of the carrier plate, turned around backward by a diverting member, and extended backward along the guide rail, and the other end is fixed to the above one of the carrier plate guided by the relevant guide rail. In this device, the cable is wired to form a loop wired like figure of 8 using right and left, front and rear diverting members, and the drum circularly reciprocates the loop.

In the apparatus of the present invention, since the right and left side of the windscreen is supported by the right and left carrier plates and the each carrier plate is supported by the guide rail through the front and rear guide means, the windscreen is supported with high rigidity against wind pressure. Further, the driving force of the actuator is about directly transmitted to the windscreen through the carrier plate, and the angle of the windscreen is maintained by the guide rail through the front and rear guide means provided on the carrier plate. Therefore, the driving force of the actuator is transmitted efficiently and smoothly to the windscreen. Since the component, which defines the angle of the windscreen in the driving force transmitted to the carrier plate, is dispersively transmitted to the front and rear guide means, the angle is maintained securely.

In the windscreen driving device for vehicles of this invention, in which the right and left guide rails are divided into a front guide rail and a rear guide rail forming a salient angle or a reentrant angle upward or backward and the front guide means is so located as to reciprocates along the front guide rail and the rear guide means is so located as to reciprocates along the rear guide rail, when the right and left carriers plate are derived forward or backward by the driving device, the up and down moving distances of the front and rear guide means are different. Thereby, the tilt angle of the carrier plate supported by the guide means changes. More specifically, in the case that the front and the rear guide rails are angled to be salient downward, the windscreen uprises when the windscreen moves backward and the windscreen contrary tilts downward to have smaller inclination when the windscreen moves forward. Inversely in the case that the guide rails are angled to be salient upward, the windscreen tilts downward to have smaller inclination when the windscreen moves backward, and the windscreen uprises when windscreen moves forward.

In whichever of the case that the guide rails are angle to be salient upward or downward, the windscreen can be upraised to suppress the wind pressure when running at high speed, for example, by scooter etc. And it can be tilted with a smaller gradient when running at low speed so as to secure the angular range of the view. Besides, in the case of sport motorcycle, riders can run at high speed with the windscreen gently laid down being adapted to the head bent forward so as to decrease wind pressure, and can run at low speed in a comfortable position with the windscreen upraised.

Since the right and left pair of front and rear guide rails are mounted on vehicles in the posture bent in the vertical direction at the midpoint, they have cubic structures with high rigidity against the longitudinal deflection caused by wind resistances. Further, since the guide rails are divided into four portions, it allows standardization of parts, cost reduction, and flexible design of mounting positions etc.

In the driving device in which the right and left guide rails are curved or bent forming salient angle upward or downward forming a front portion of the guide rail and a rear portion of the guide rail, and the front guide means is so located as to reciprocate along the front portion of the guide rail and the rear guide means is so located as to reciprocate along the rear portion of the guide rail, it has the higher rigidity since the front and rear portions of the guide rails are continuous. In other points, it is substantially same as the driving device described above.

In the case that the cross section of the guide rail is about C-shaped, the strength of the guide rail itself is higher to have the higher supporting strength. Further, since the guide means are tucked above and below, the guide action is secure.

In the case that the actuator comprises a cable coupled to the carrier plate and a motor to reciprocate the cable, since the mounting point of the motor can be diversely selected, the allowance of the actuator design for vehicles is high.

In the case that the actuator couples the right and left carrier plates with the loop cable so as to synchronously reciprocate the right and left carrier plates along the guide rails by changing the rotative direction of the loop cable which is driven by the motor, which means that the right and the left carrier plate is coupled by the loop cable, the right and left carrier can be synchronously driven by one motor. In other words, when the motor is rotated in one direction, the right and left carrier plates moves forward synchronously, and when it is rotated in other direction, they moves backward synchronously, thereby the windscreen stably moves forward or backward accompanying the smooth angle change.

In the apparatus or the driving device provided with the actuator in which the cable is wired like figure of 8, the right and left carrier plates can be synchronously reciprocated by one cable driving mechanism. Therefore, the composition is simple and the synchronization is secure, although the interval between the right and the left guide rails are large. Further, since the first cable couples the right and the left carrier plates each other, the backlash of the right and the left carrier plate can be suppressed.

BRIEF DESCRIPTION OF DRAWINGS

FIG. 7a is a plan view showing an embodiment of a housing of a cable driving mechanism of this invention;

FIG. 7b is a VIb-VIIb line cross section of FIG. 7a, and FIG. 7c is a front view from the arrowhead VIIc of FIG. 7a;

FIGS. 8a, 8b, and 8c are a plan view, side view and bottom view showing an embodiment of the cable driving mechanism of this invention respectively, and FIG. 8d is a VIII-VIII line cross section of FIG. 8a;

BEST MODE FOR CARRYING OUT THE INVENTION

Figure 1:
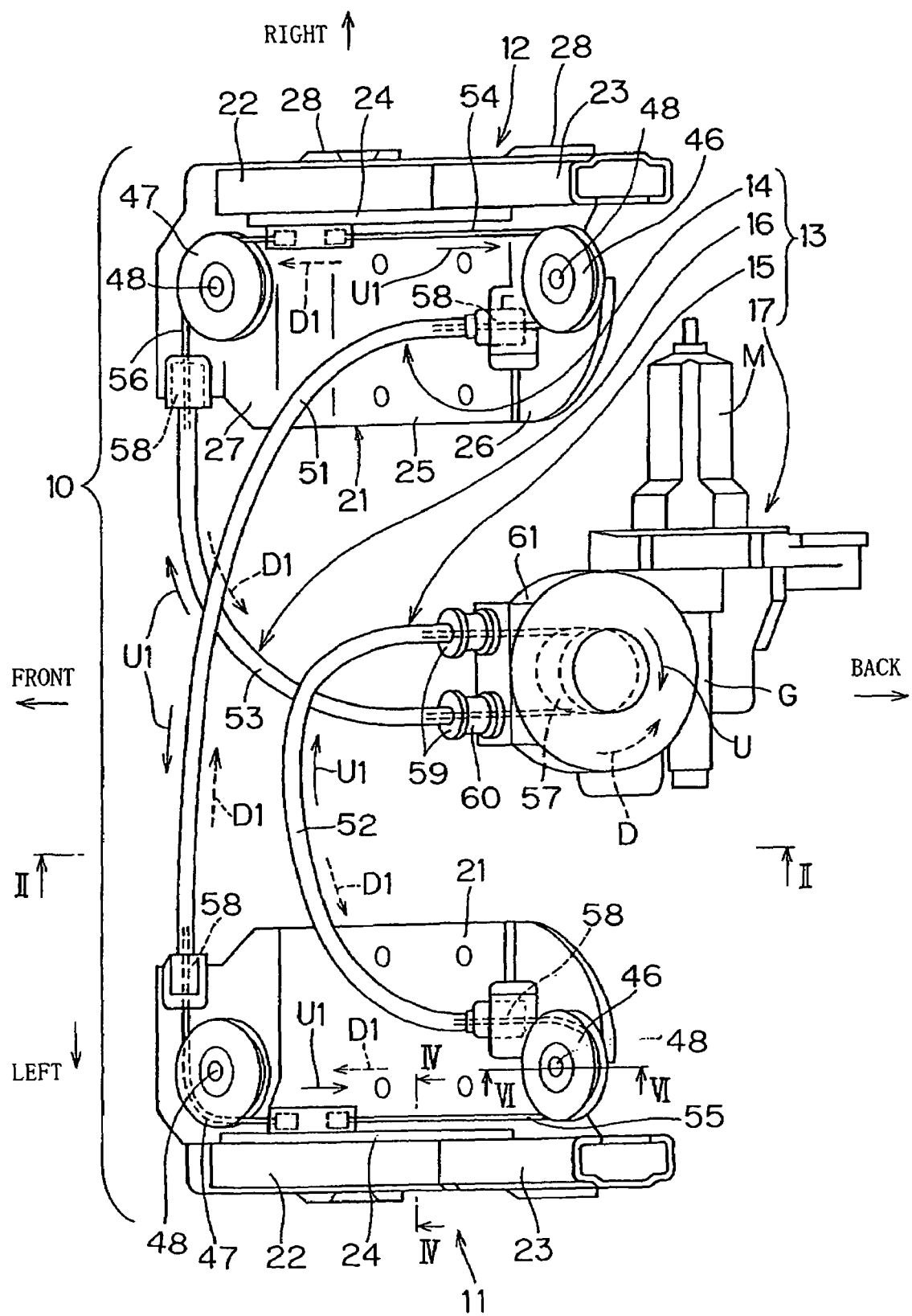
FIG. 1 is a plan view showing an embodiment of the driving device of this invention.
Figure 2:
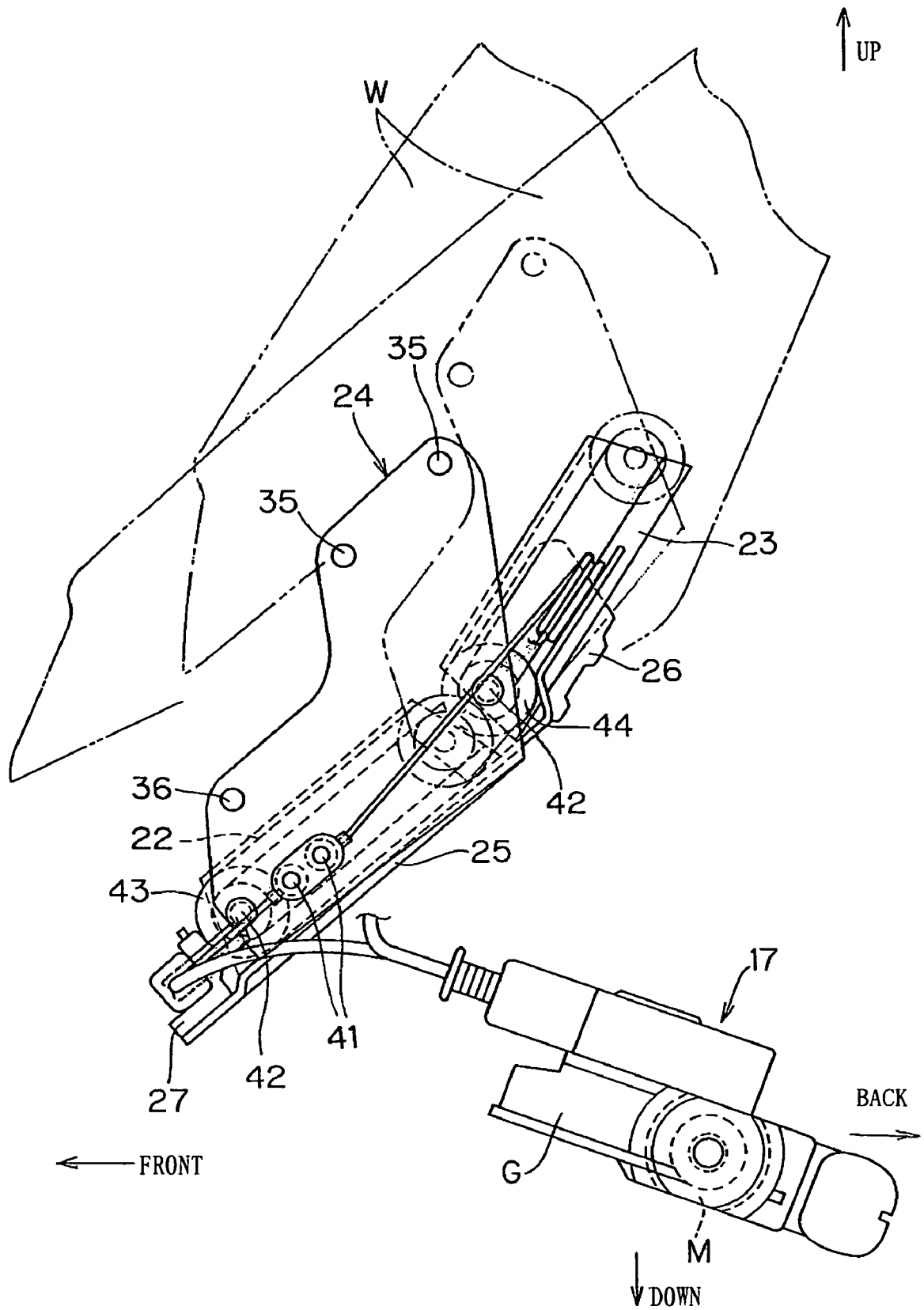
FIG. 2 is a II-II line cross section of FIG. 1.

The driving device 10 shown in FIGS. 1 and 2 comprises one pair of right and left guide mechanisms 11, 12 and an actuator 13 to electrically drive the tilting motion of the guide mechanisms. The actuator 13 comprises a first control cable 14 which couples the right and left guide mechanisms 11, 12 mutually, and a cable driving mechanism 17 which is coupled to the left guide mechanism 11 through a second control cable 15 and is coupled to the right guide mechanism 12 through a third control cable 16.

Since the right and left guide mechanisms 11, 12 are substantially similar, the right guide mechanism 12 is described bellow. The guide mechanism 12 is provided with a platy base 21, a front guide rails 22 and a rear guide rail 23, fixed to the base having about C-like cross section, and a carrier plate 24 guided by those guide rails. As shown in FIG. 2, the base 21 (FIG. 1) is provided with a medium section 25 fixed to a vehicle body with a given tilt angle and a rear section 26 extending from the rear edge of the medium section with a larger tilt angle. The base 21 is made from metal plate by pressure molding. The base 21 of the right and left guide mechanisms 11, 12 can be shaped from one metal plate. It can also be made by metal forging, synthetic resin molding etc.

As shown in FIG. 1, rail holding parts 28 which hold the front guide rail 22 and the rear guide rail 23 are provided in the right side of (for the left side base, it is in the left side) the medium section 25 and the rear section 26 of the base 21. These rail-holding parts 28 can be provided by bending up the metal plate composing the base 21.

Figure 3:
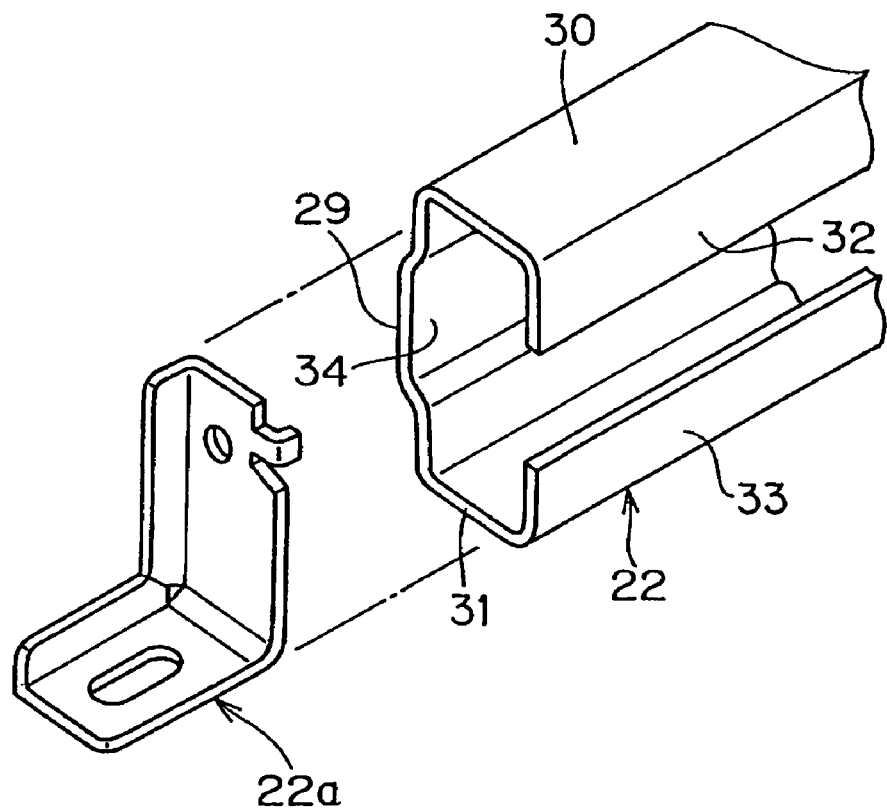
FIG. 3 is a substantial part perspective view of a guide rail of the driving device of FIG. 1.
Figure 4:
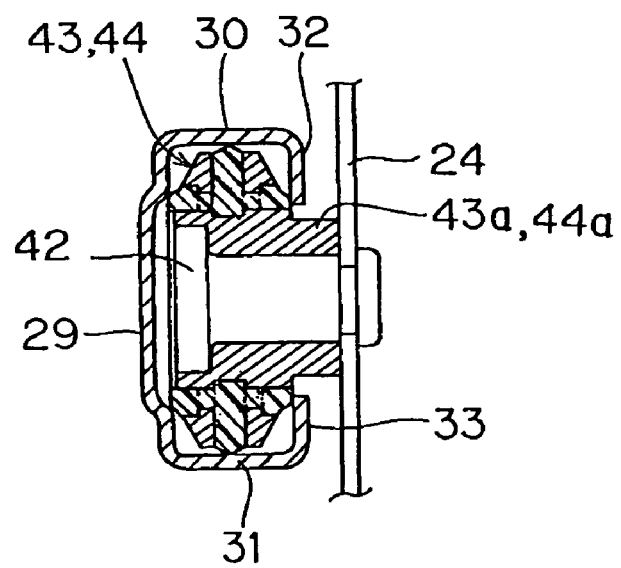
FIG. 4 is a IV-IV line cross section of FIG. 1.

As shown in FIG. 3 and FIG. 4, the each guide rail 22, 23 has about C-like cross section and provided with a sidewall 29, a upper wall 30, and a lower wall 31 bent inside from the upper edge and lower edge of the side wall. Further in this embodiment, the each guide rail has a lip portion 32 which is bent downward from the edge of the upper wall 30 and a lip portion 33 which is bent upward from the edge part of the lower wall 31, being like lightweight channel steel with lip. In the center of the sidewall 29, a shallow groove 34 protruding laterally is formed. The right and left guide rails 22, 23 are located to have the opening of the guide rails facing each other, in other words, to have the opening facing inside. The reference numeral 22a of FIG. 3 is an about L-shaped standing stopper mounted on the base 21 (FIG. 1) in the vicinity of the lower edge of the front guide rail 22. This stopper restricts the lower limit of the front guide members (the reference numeral 43 of FIG. 2) in the guide rail 22.

As shown in FIG. 2, the front guide rail 22 and the rear guide rail 23 are located front and back in a bent attitude forming salient angle downward. In this embodiment, there is a gap between the front guide rail 22 and the rear guide rail 23, but this gap can be omitted and they can be continuous. Further, the front guide rail 22 and the rear guide rail 23 can be not lined up from side to side. Folding a metal plate into the shape of the above cross section can produce the guide rail 22, 23. They can also be made by extrusion molding and cut-off grinding. In the embodiment shown in FIG. 2, the each guide rail 22, 23 has the same shape with their both sides being cut crosswise and their side being roughly shaped like trapezoid. These guide rails 22, 23 can be fixed to the base 21 (FIG. 1) by, for example, spot welding or caulking.

Figure 5:
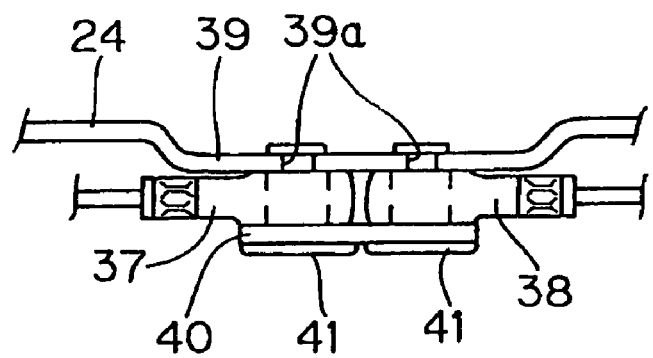
FIG. 5a and FIG. 5b are a plan view and a side view showing the coupled condition of a carrier plate and an inner cable of FIG. 1 respectively.
Figure 5:
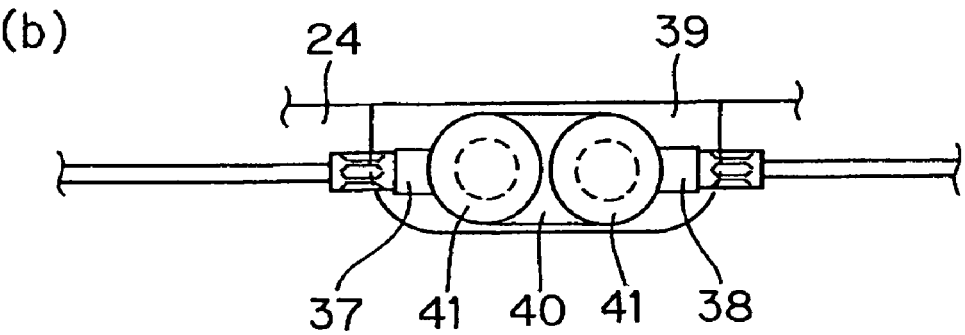

As shown in FIG. 2, the carrier plate 24 is roughly L-shaped platy member having mounting holes 35, 35 for mounting a windscreen W in its upper edge. Further, as shown in FIG. 5, a mounting pedestal 39 for mounting cable ends 37, 38 is protrusively provided. The carrier plate 24 can be composed of the two above and under metal plate, and the medium section can be welded in piles. In this case, a notch can be formed in the upper edge of the under metal plate, and this notch is covered by the tongue extending from the lower edge of the above plate. Thereby, the mounting pedestal similar to that shown in FIG. 5 may be formed.

In the mounting pedestal 39, two through holes 39a are formed. The cable ends 37, 38 are tucked in between the mounting pedestal 39, and a presser plate 40. Shafts 41, 41 for penetrating the pressure plate 40, the cable ends 37, 38, and the mounting pedestal 39 of the carrier plate in sequent order are inserted to fix the cable end 37, 38 rotatably against the carrier plate 24. The axis of the shaft 41, 41 i.e. the rotation axis is perpendicular to the paper as shown in FIG. 2 (the lateral direction in FIG. 1).

As shown in FIG. 2, guide members 43, 44 are fixed by shafts 42, 42 at the lower part of the front edge and the rear edge of the carrier plate 24, respectively. The pitch of the front and rear guide members 43, 44 is identical with the length that is the forward or backward travel of the rear guide member 44 in the rear guide rail 23 in conformity with the travel of the front guide member 43 in the front guide rail 22. The mounting of the guide members 43, 44 is carried out as shown in FIG. 4. The front edge of the shaft 42 is fixed to the carrier plate 24, and the bosses 43a, 44a of the guide members 43, 44 are fixed around the shaft 42 to hold the guide members 43, 44. The head of the shaft 42 is engaged with the concave portion or the step provided on the guide members 43, 44. The bosses 43a, 44a are protruded outwardly through the gap of the lip portions 32, 33 of the guide rails 22, thereby the edge faces of the bosses 43a, 44a are slidably contacted to the carrier plates 24, allowing stable holding.

In this embodiment, major part of the guide members 43, 44 including the bosses 43a, 44a is made of synthetic resin such as polyacetal, and the contacting face with the inside of the guide rail 22 is made of urethane, thereby allowing smooth slide with small play. Guide rollers supported slidably to the carrier plate 24 can be provided in place of the guide members 43, 44, in which case the guide rollers rotate in the guide rail 22. The guide means described in the claims include guide rollers other than sliding shoes. In the case that the guide members 43, 44 are shaped into a circular form and the guide members are fixed to the carrier plates 24, 24, because the guide members can rotate in the guide rail, the angle of the guide member in the forward and backward direction can be changed in the guide rail. In the case that the guide member is square sliding shoe whose angle cannot be changed in the guide rail, the square sliding shoes are fixed to the carrier plates 24 rotatably around the axis extending right and left to the carrier plate 24 to have the carrier plate change its angle.

Figure 6:
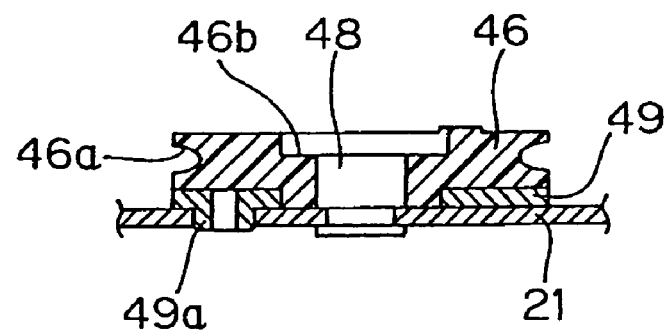
FIG. 6 is a VI-VI line cross section of FIG. 1.

As shown in FIG. 1, in the rear part 26 and a front part 27 of the base 21, the cable diverting pulleys 46, 47 are fixed rotatably by shafts 48. As shown in FIG. 6, a V groove 46a is formed on the periphery of the pulley 46 and a concave portion 46b is formed on its top face to which the head of the shaft 48 fits. Further in this embodiment, a liner 49 made of synthetic resin having high slip factor is intervened between the pulley 46 and the base 21. In the rear side of the liner 49, a projection 49a, which fits to the hole formed in the base 21, is provided for a baffle. A circular or sectorial sliding guide provided with a groove for guiding the inner cable of the control cable slidably can be used in place of the pulley.

As shown in FIG. 1, the first, the second, and the third cable 14, 15, 16 are the publicly known drawing control cables comprising conduit tubes (outer) 51, 52, 53 and the inner cables (inner) 54, 55, 56 slidably inserted in the conduit tubes. The conduit tubes 51, 52, 53 are composed of an armor layer of spirally winded metal wire and a sheath layer of synthetic resin which covers the periphery of the armor layer, and have a degree of flexibility. The inner cables 54, 55, and 56 are the cables made by twisting metal wires. The inner cables have flexibility and can transmit tensility. The conduit tube can support a compressive force that is a reactive force of the tensility. There is a case that a liner made of synthetic resin tube is provided inside of the armor layer, and that synthetic resin coat is provided around the periphery of inner cable.

As shown in FIG. 1, the inner cable 54 of the first control cable 14 is fixed in the following condition. One end of the inner cable 54 of the first control cable 14 is fixed to the mounting pedestal of the right carrier plate 24 and the cable is extended upward (backward) along the guide rails 22, 23, and then diverted about 180 degrees in the direction by the rear pulley 46. Further, the first control cable 14 is guided by the conduit tube 51 to the front pulley 47 of the left guide mechanism 11, and it is diverted about 90 degrees in the direction. Then it is extended upward (backward) with its other end being fixed to the mounting pedestal of the left carrier plate 24.

The inner cable 55 of the second control cable is fixed in the following condition. One end of the inner cable 55 of the second control cable 15 is fixed to the mounting pedestal of the left carrier plate 24 and the cable is extended upward (backward) along the guide rails 22, 23, and then diverted about 180 degrees in the direction by the pulley 46. Then it is guided to the cable driving mechanism 17 by the conduit tube 52 of the second control cable 15 and wounded around the drum 57 with its end being fixed to the drum 57.

The third cable 56 of the third control cable 16 is fixed in the following condition. One end of the inner cable 55 of the third control cable 16 is fixed to the drum 57 and its vicinity is wounded around the drum 57. The cable 55 is guided to the right guide mechanism 12 through the conduit tube 53 of the third control cable 16. And then, it is diverted upward in the direction by the front pulley 47 with its end fixed to the mounting pedestal of the right carrier plate 24.

The fixing of the conduit tube 51~53 to the base 21 is done by a method publicly known. For example, a longitudinal groove or an annular groove of a casing cap 58 fastened on the end of the conduit tube 51~53 is engaged with the notch or the standing piece formed in the base 21. In the rear part of the base 21, the ends of the conduit tube 51, 52 are held upward to guide the inner cable downward with a slope. In the front part of the base 21, the ends of the conduit tube 51, 53 are held in a lateral direction. The ends of the conduit tubes 52, 53 are so coupled to the cable driving mechanism 17 that the casing cap 59 fixed to the end of the conduit tube is held slidably in the axial direction, and that a tensile force is applied to the inner cable by biasing the casing cap 59 with the spring 60 in the direction to draw away from a housing 61 of the cable driving mechanism 17.

As shown in FIG. 1 and FIG. 2, the cable driving mechanism 17 is provided with the housing 61 having bottomed cylinder shape, the drum 57 accommodated rotatably in the housing, a motor M to rotate the drum, and a reducer G intervened between the motor M and the drum 57. In this embodiment, a worm reducer is used as the reducer G, other types of the reducer can be used. However, it is preferable to use the reducer having a function of self-restraint to restrain the position of the carrier plate 24 in the condition of the motor halt.

Figure 7:
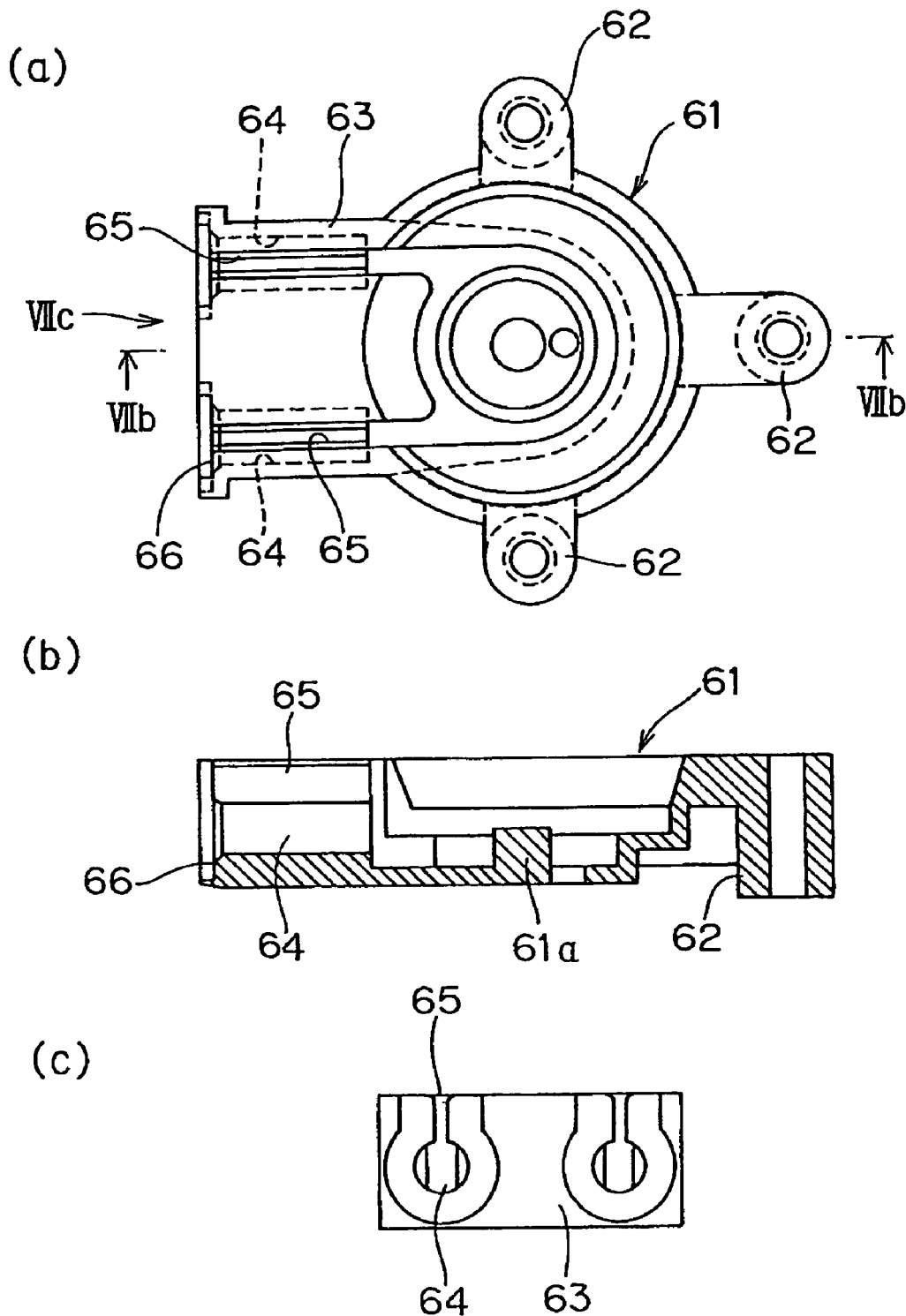

As shown in FIG. 7a, 7b, the housing 61 is provided with legs 62 for attaching to a vehicle body and a cap holder 63 for holding the casing cap (reference numeral 59 of FIG. 1) slidably in the axial direction. The cap holder 63 has a cap holding hole 64 extending to the direction of tangential line of the drum accommodated in the housing 61, and the cap holding hole 64 is communicated with the outside through a slit 65 to pass through the inner cable. In the front edge of the cap holder 63, a concave portion is formed to be a pedestal 66 for accepting the end of the spring 60 (FIG. 1). In the center of the inside bottom of the housing 61, a supporting shaft 61a to support the drum is protruded.

As shown in FIG. 8a, the drum 57 is provided with a cylindrical drum body 67 and a sectorial guide projection 68 protruding outward in a radial direction from a point of the periphery of the drum body 67. As shown in FIG. 8a, a cylindrical engaging hole 69 to engage with the cable end fastened to the end of the inner cable is formed in the other end face of the drum body 67, and the engaging hole 69 and a guide groove 70 formed spirally in the periphery of the drum 67 are continued smoothly through the inserting groove 71. In the center of the drum body 67, a hole 72 fitted rotatably to the supporting shaft 61a of the housing 61 is formed as shown in FIG. 7a, b.

As shown in FIG. 8c, a rough rectangular engaging hole 73 to engage the cable end is formed in the rear side of the guide projection 68. The engaging hole 73 is smoothly continued to a guide groove 75 formed in the periphery of the guide projection 68 through the inserting hole 74. Further, as shown in FIG. 8b, the guide groove 75 is smoothly continued to the end face 76 extending along tangential line of the guide groove 70 of the drum body. In the end face 76, a guide groove to guide the cable can be formed. Besides, as shown in FIG. 8c, and FIG. 8d, in the rear face of the guide projection 68, a rectangular column like engaging hole 77 for enabling the torque transmission is formed to fit to the output shaft (the worm wheel shaft) of the reducer (the reference numeral G of FIG. 1).

Providing the guide projection 68 on the drum 57 allows lessening the drum diameter to adjust operation speed and forming the large engaging hole 77 in the drum 57. Thereby the torque from the motor M can be securely transmitted to the drum. The reference numeral 78 of FIG. 8a~c is a sliding contact piece which slidably contacts to the housing bottom, and it is formed to balance with the contact pressure of the guide projection 68.

The driving device 10 composed as described above operates as follows; when the drum 57 rotates in the arrowhead direction U driven by the one way rotation of the motor M of the cable driving mechanism 17 of FIG. 1, the inner cable 55 of the second control cable 15 is rolled up and the inner cable 56 of the third control cable 16 is wound off, thereby the loop of the inner cable 54, 55, 56 wired like figure of 8 by the front and rear, right and left four pulleys 47, 46 circulate in the arrowhead direction U1 shown by the solid line. With that, as shown in FIG. 2, the front guide member 43 of the each carrier plate 24 ascends backward along the front guide rail 22 and the rear guide member 44 ascends backward along the rear guide rail 23. Thereby the carrier plate 24 uprises backward at a steep angle from the condition shown in the solid line to that shown in the imaginary line upraising the windscreen W mounted on the carrier plate 24 from a gradual angle to a steep angle. This is a condition of running at high speed.

When the motor M rotates in the reverse direction and the drum 57 rotates in the arrowhead direction D shown by the dotted line, contrary to the above description, the loop of the inner cable 54, 55, 56 circulates in the arrowhead direction D1 shown in the dotted line, and the carrier plate 24 descends forward with its gradient angle becoming gradual to the horizontal line. The gradient angle of the windscreen W also becomes gradual. This is a condition of running at normal speed. In case of necessity, it can be so composed that the motor M is halted in an arbitrary position and the tilt of the windscreen W is set at an arbitrary angle. In each case, the self-restraining function of the reducer G allows the stable holding of the windscreen angle in the halted condition of the motor M.

During the above tilting motion, the angle of the carrier plate 24 to the guide rail 22, 23 changes, but it is absorbed by the guide members 43, 44. The angle between the inner cable and the carrier plate 24 also changes, but it is absorbed by the rotation of the cable ends 37, 38 of FIG. 5 in relation to the carrier plate 24. Further, between the pulleys 47 and 46, the pathway of the inner cable changes and the wire length changes, but since the casing cap 59 is provided movably to the cable driving mechanism 17 and it is pressed by the spring 60, the wire length change is absorbed maintaining the appropriate tensility of the inner cables.

Figure 9:
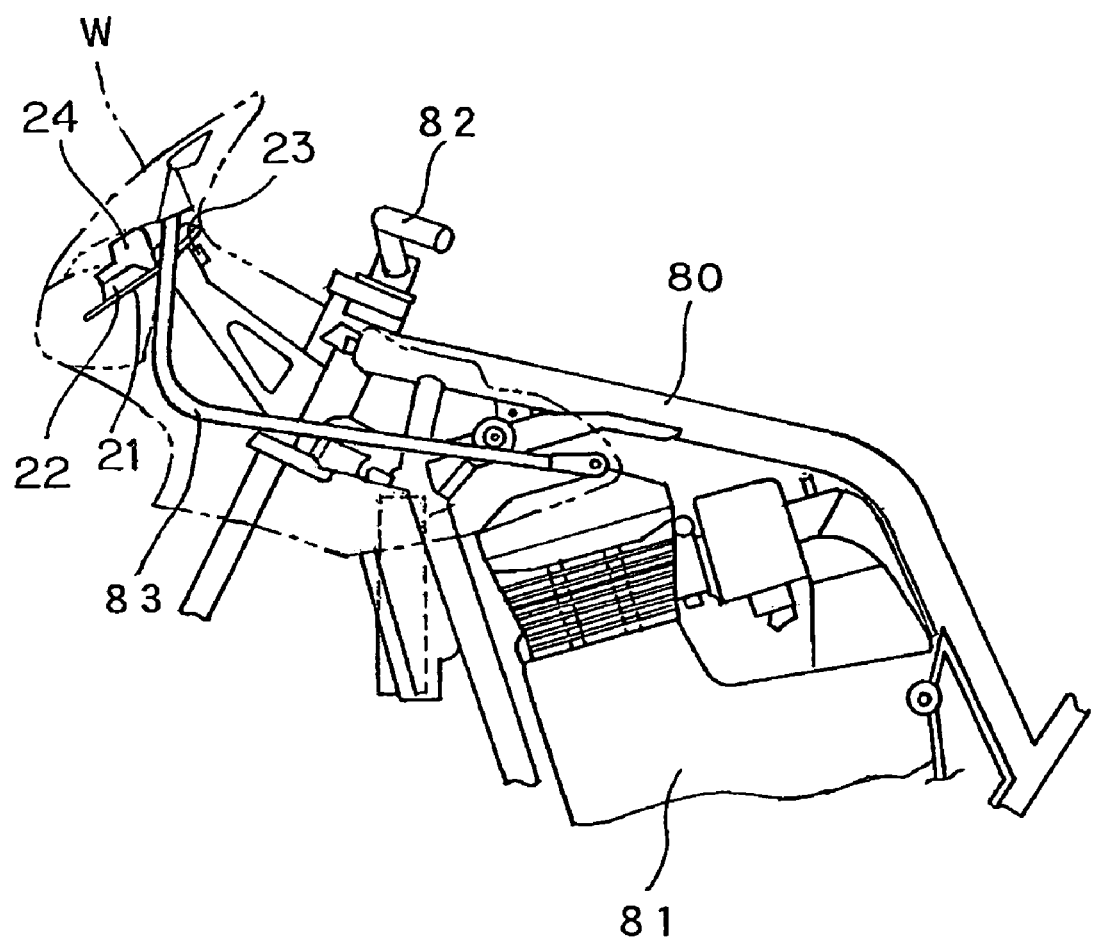
FIG. 9 is a substantial side view showing an example of motorcycle provided with the driving device of this invention.

The driving device 10 is set up in the front part of the motorcycle, for example as shown in FIG. 9. In FIG. 9, the reference numeral 80 is a main frame, the reference numeral 81 is an engine, and the reference numeral 82 is a handle. The base 21 supporting the guide rails 23, 24 is mounted with its front side being low at a gradual slant to a sub-frame 83.

Figure 10:
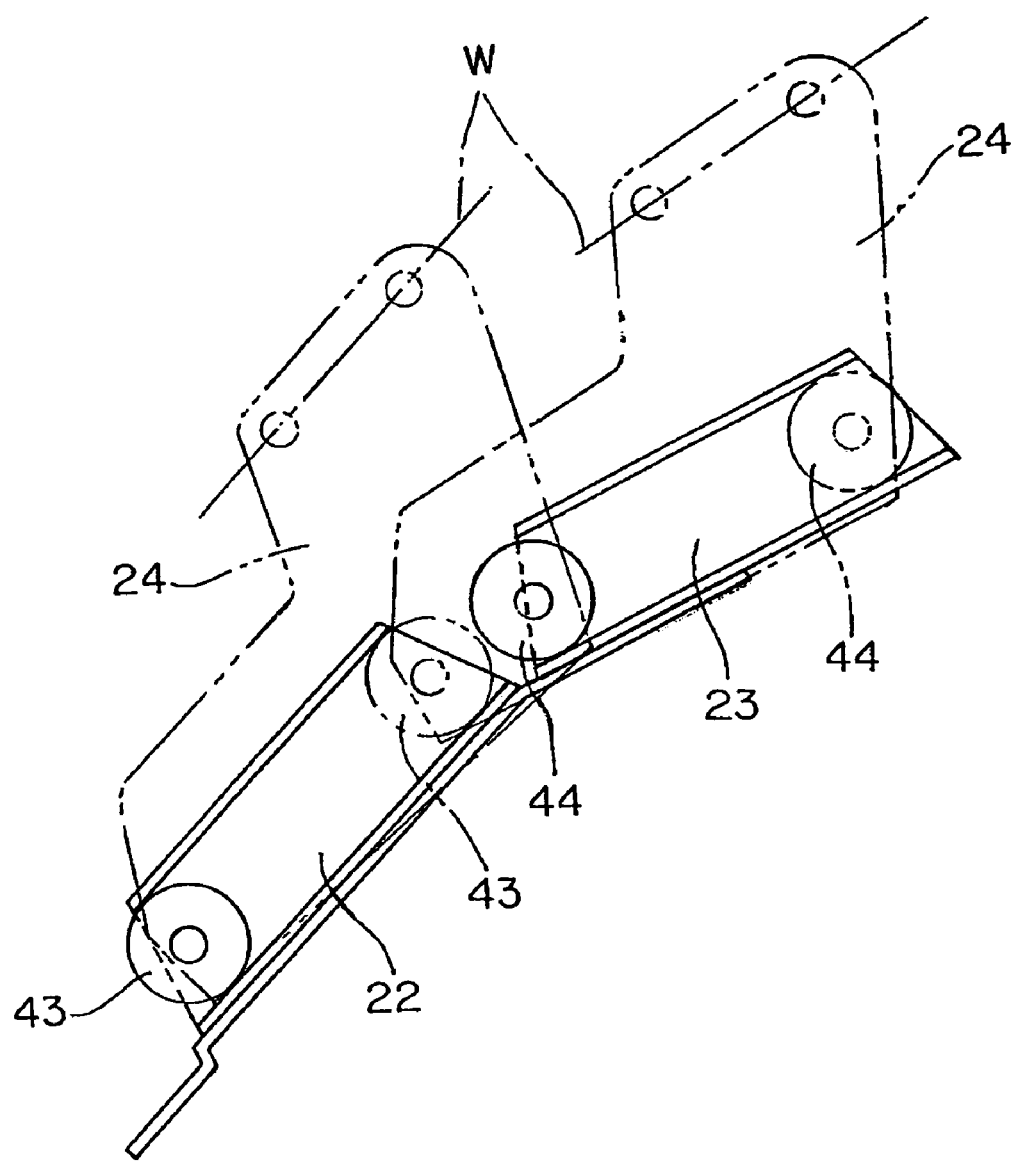
FIG. 10 is a rough side view showing the other embodiment of this invention.

In the above embodiment, the rear guide rail 23 is tilted to a steeper angle than that of the front guide rail 22, but, as shown in FIG. 10, the front guide rail 22 can be tilted to a steeper angle than that of the rear guide rail 23, thereby being located to be convex upward. In this case, as shown in the imaginary line, when the windscreen W moves forward, it uprises, and when it moves backward, it tilts to a gradual angle.

Figure 11:
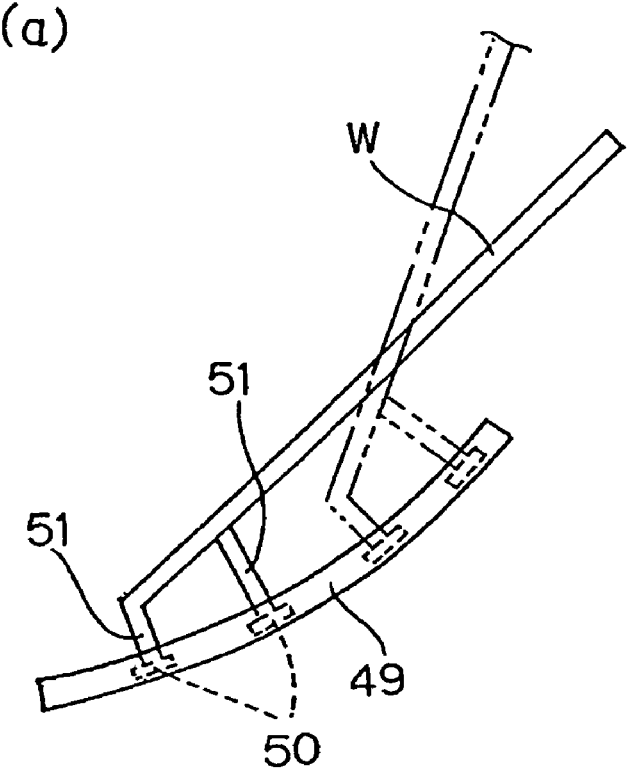
FIG. 11a and FIG. 11b are rough side views further showing the other embodiments of this invention.
Figure 11:
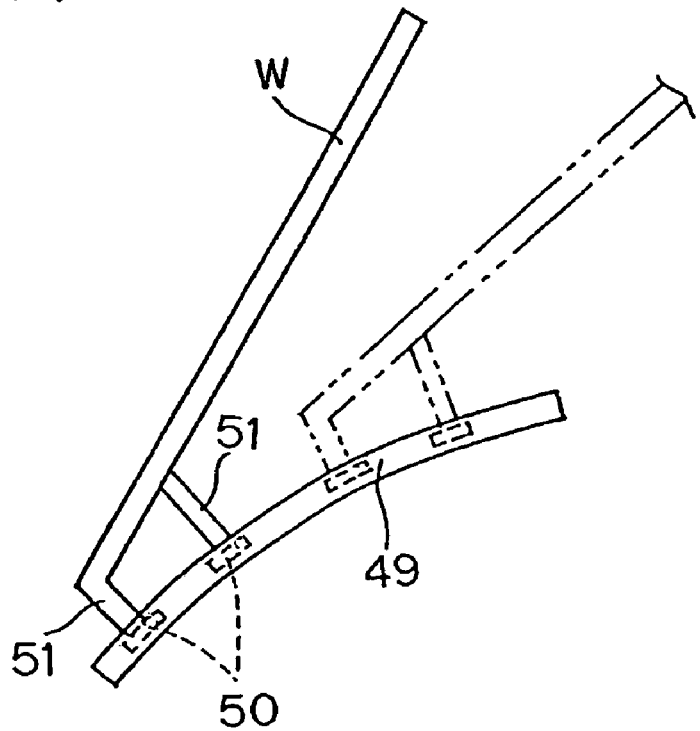
Figure 12:
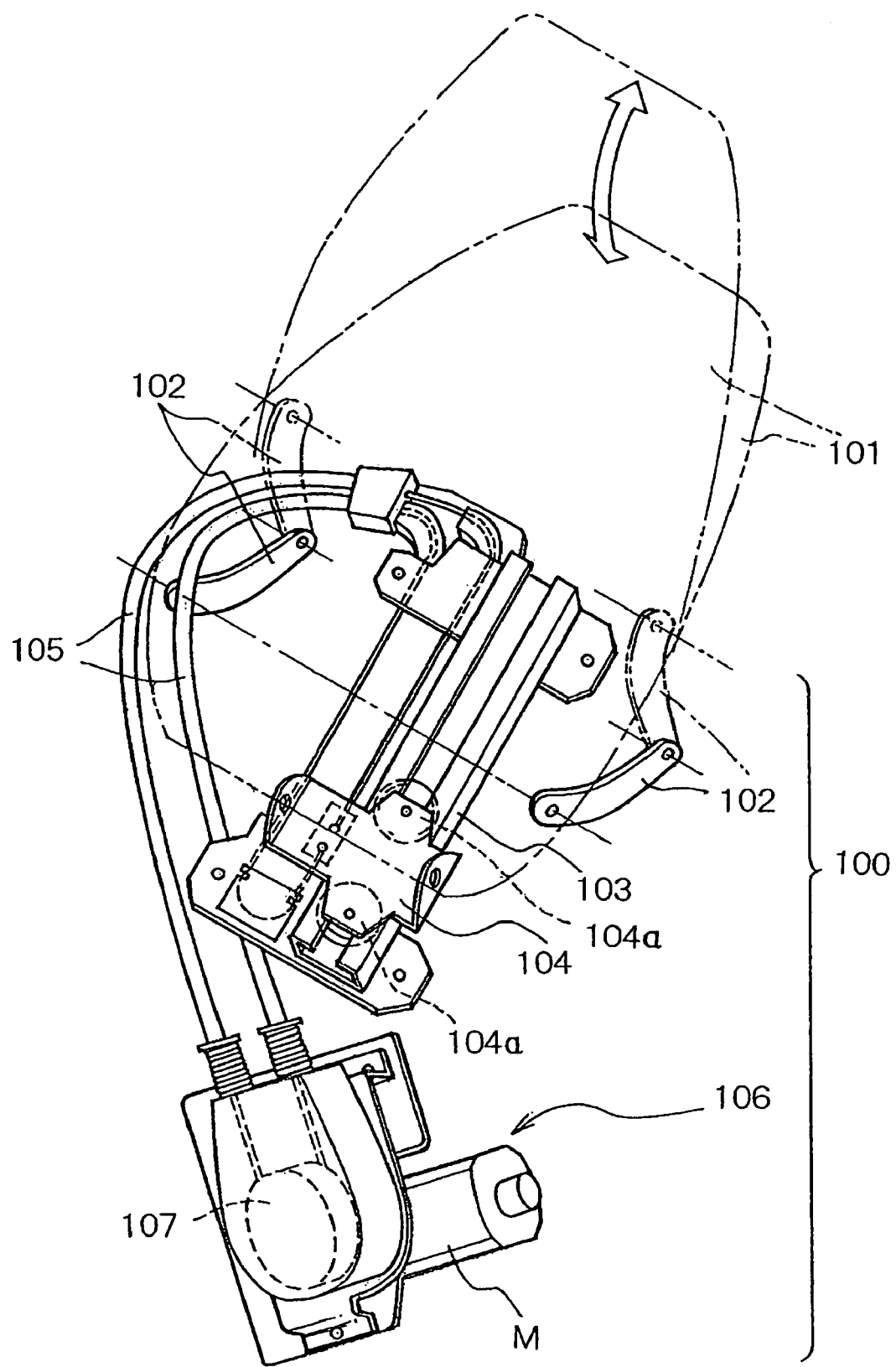
FIG. 12 is a perspective view showing an example of conventional driving devices.

Further, in the above embodiment, the front and the rear guide rails 22,23 are separated, but they can be composed as one body guide rail bent or curved along the way. In this case, as shown in FIG. 11a, the whole guide rail 49 can be gradually curved at the same curvature radius so as to be concave downward. In this case, even in the case that it is supported by the slide shoe 50 which cannot tilt practically in the guide rail 49, the slide shoe 50, a stay 51 coupling the slide shoe and the windscreen W are wholly move around the center of the curvature of the guide rail 49. Resultantly, it uprises in the backward movement, and becomes gradual angle in the forward movement.

Inversely as shown in FIG. 11b, the guide rail 49 can be curved so as to be convex upward. In this case, since it moves around the center of the curvature of the curved guide rail 49, it uprises in the forward movement, and becomes gradual angle in the backward movement. Further, in the case that it is not necessary to tilt or in the case that other driving means are provided, the continuous front and the rear guide rails 49 can be straight without bending or curve. In the before and behind separated type driving device, the front guide rail and the rear guide rail can be located in a straight line or located in parallel each other.

Further in the above embodiment, the whole body of the guide rail is tilted in accordance with the mounting angle of the windscreen W, that it ascends as it moves backward. However, since the tilt angle of the windscreen W is dependent upon the relative angle of the front and rear guide rail, the other angle of the whole body of the guide rail can be employed, for example, to be horizontal etc. But, when it is adapted to the angle of the windscreen W, the tilting motion gets close to the rotation around the center of rotation perpendicular to the face of the windscreen W, and the element of parallel shift is decreased. Thereby the operator can easily grasp the motion with a merit to decrease the space required for shifting the windscreen W.

Figure 8:
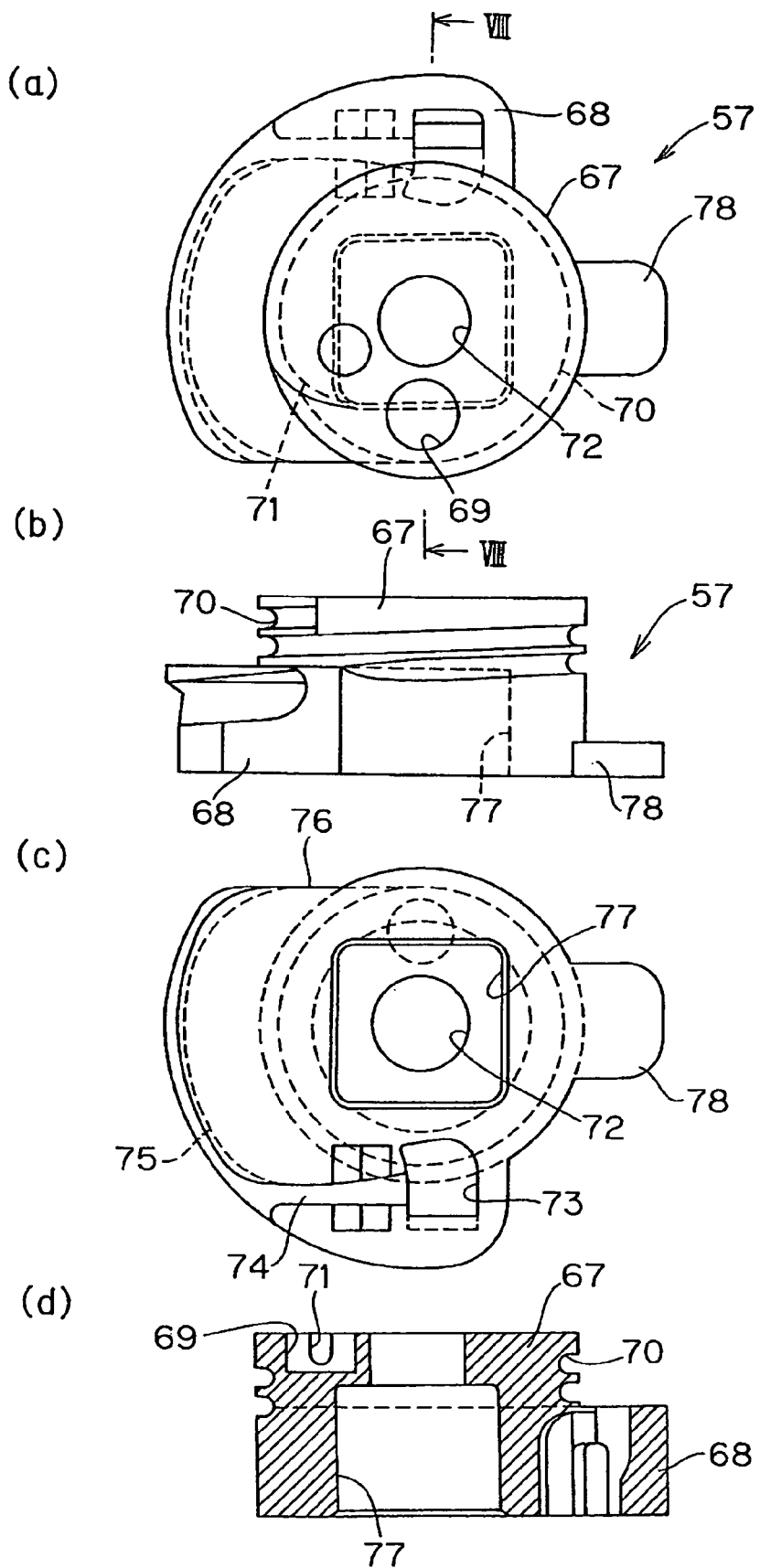
Figure 13:
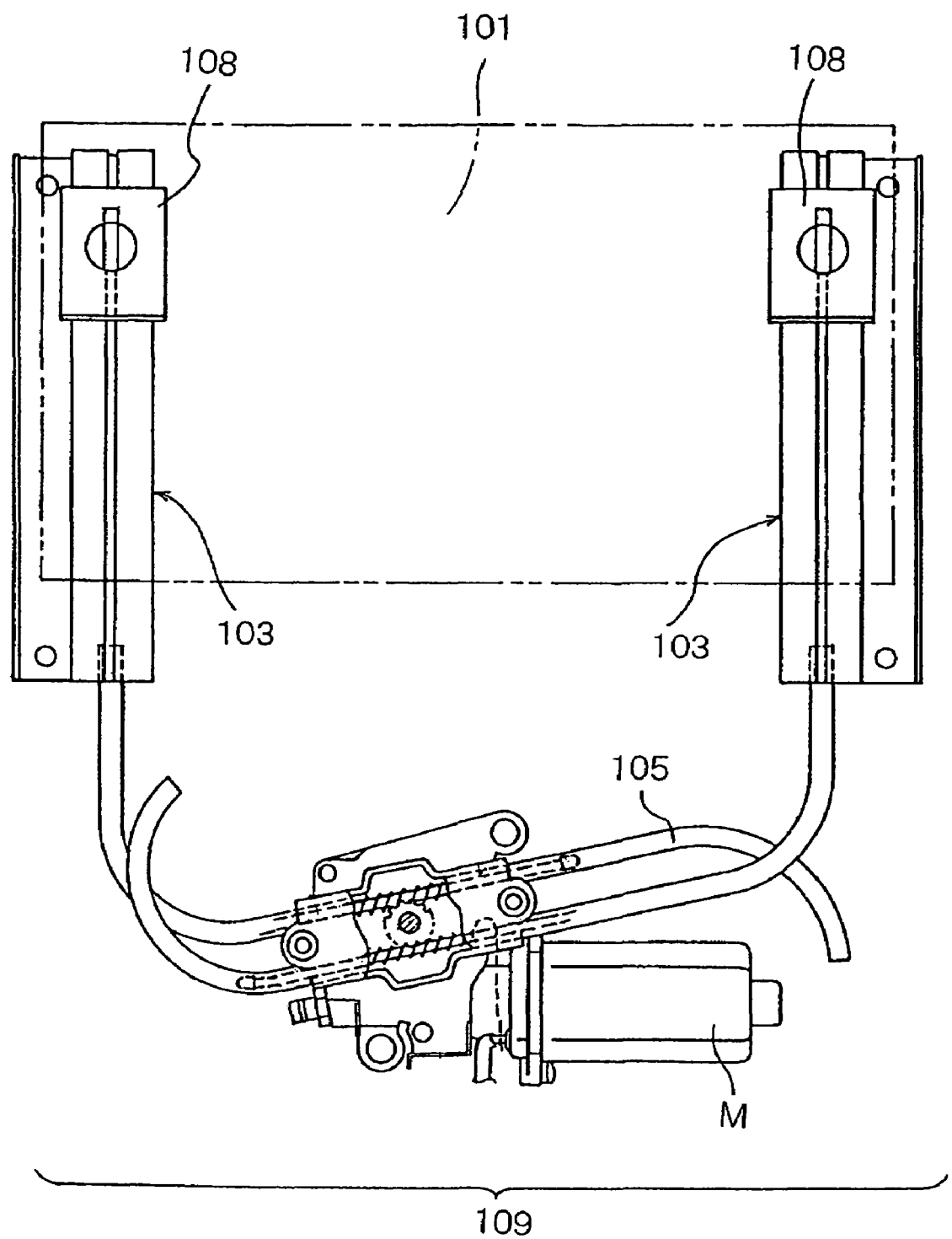
FIG. 13 is a side view showing the other example of conventional driving devices.
Figure 14:
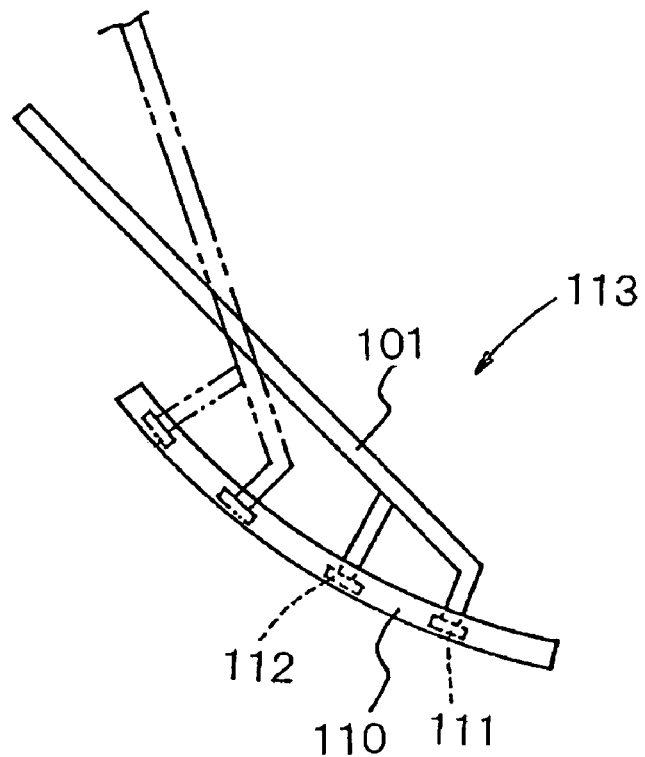
FIG. 14 is a side view further showing the other example of conventional driving devices.
Figure 15:
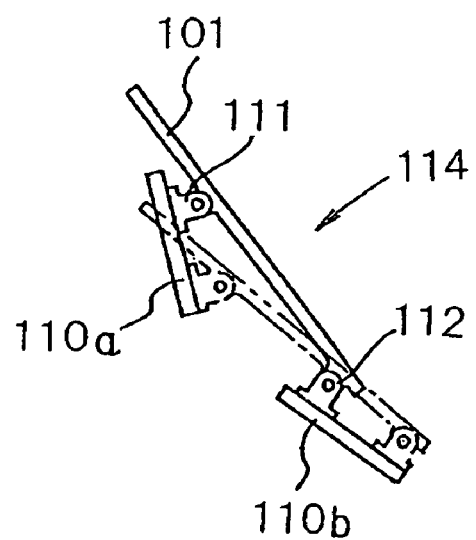
FIG. 15 a side view further showing the other example of conventional driving devices.

In the above embodiment, the ends of the two inner cables are engaged with the carrier plate 24 and wholly the three inner cables wired like figure 8 are used, but the mid way of the one inner cable can be coupled to the carrier plate 24. In this case, the both ends of the one inner cable are engaged with the drum. Further, a right and left one pair of push and pull control cable, particularly a dentate cable, can be used to transmit the driving force of the motor to the carrier plate 24 as shown in FIG. 13. In the above embodiment, the control cable wired like figure 8 and the cable driving mechanism drive the right and the left carrier plate 24 synchronously, and the motor rotation is converted into the rough straight reciprocating motion. However, employing other converting mechanisms of rotation to rough translatory movement such as a combination of rack and pinion, or screw and nut etc., the lateral movement can be synchronized by the other power transmission mechanism such as rods etc. Employing control cables including push and pull control cables allows easy power transmission between distant positions, and further, the smooth straight driving of the carrier plate 24 which changes the angle gradually.

In the above embodiment, the carrier plate 24 is made of metals having high strength and high rigidity for fixing the windscreen W to the right and the left carrier plate 24. Thereby the vehicle body and the windscreen W can be packed separately, and mounted separately in delivery agents. But, the carrier plate 24 can be shaped into one body of the windscreen W by insert molding. Furthermore, in the case that the strength and the rigidity of the windscreen W are high, a part of the windscreen W is made into a carrier plate. In this case, the guide members 43, 44 are mounted on the front and rear of the both sides of the windscreen W and the cables are coupled to the windscreen W. The coupling point is preferable to be the mid part of the mounting point the guide members.

In the above embodiment, the driving devices for the windscreen of the motorcycles are shown, but it can be used as a windscreen (wind shield) driving device for other vehicles such as four wheeled all terrain vehicles, personal watercrafts, snow mobiles etc.

What is claimed is:

1. An apparatus for driving a windscreen of vehicles which tilts the windscreen with moving up and down motion, comprising:
a pair of guides rail fixed to the right and the left side of the vehicle;
front and rear guide means movably located along the each guide rail;
right and left carrier plates supported by the front and rear guide means supporting right side and left side of the windscreen; and
an actuator which reciprocates the right and left carrier plates along the guide rails.

2. The apparatus for driving the windscreen of vehicles according to claim 1,
wherein the right and left guide rails are divided into a front guide rail and a rear guide rail forming a salient angle upward or downward; the front guide means is located as to reciprocates along the front guide rail and the rear portion of the guide means is located as to reciprocate along the rear guide rail.

3. The apparatus for driving the windscreen of vehicles according to claim 1,
wherein the right and left guide rails are curved or bent forming salient angle upward or downward and forming a front portion and a rear portion;
the front guide means is located as to reciprocate along the front portion of guide rails and the rear guide means is located as to reciprocate along the rear portion of guide rails.

4. The apparatus for driving the windscreen of vehicles according to claim 1, wherein a cross section of the guide rail is about C-shaped.

5. The apparatus for driving the windscreen of vehicles according to claim 1, wherein the actuator comprises a cable connected to the carrier plate and a motor to reciprocate the cable.

6. The apparatus for driving the windscreen of vehicles according to claim 5,
wherein the actuator couples the right and left carrier plates with the cable having loop so as to synchronously reciprocate the right and left carrier plates along the guide rails by changing the rotative direction of the loop cable driving by the motor.

7. The apparatus for driving the windscreen of vehicles according to claim 6,
wherein the cable of the actuator comprises;
a first cable, where one end is fixed to either one of the right or the left carrier plate, extended backward along the relevant guide rail, turned around sideways by a diverting member in the vicinity of the rear end of the guide rail, guided to the vicinity of the front end of the other guide rail through a conduit tube, turned around backward by a diverting member, extended backward along the relevant guide rail, and the other end is fixed to the other carrier plate which is guided by the relevant guide rail;
a second cable, where one end is fixed to the other carrier plate, extended along the relevant guide rail, turned around sideways by a diverting member in the vicinity of the rear end of the guide rail, guided through a conduit tube to a cable driving mechanism driven by the motor, and the other end is fixed and wounded around to a drum of the cable driving mechanism,
and a third cable, where one end is fixed and wounded around to the drum, guided through a conduit tube to the vicinity of the front end of the guide rail which guides one of the carrier plate, turned around backward by a diverting member, extended backward along the guide rail, and fixed to the above one of the carrier plate guided by the relevant guide rail.

* * * * *